United States Patent
Brown et al.

(10) Patent No.: US 8,149,558 B2
(45) Date of Patent: Apr. 3, 2012

(54) CONTACTOR ENGAGEMENT SYSTEM AND METHOD

(75) Inventors: Carlton D. Brown, Royal Oak, MI (US); Jacob R. Bemrich, Rochester Hills, MI (US); Daniel Sisco, West Bloomfield, MI (US); Timothy Henigan, Rochester Hills, MI (US)

(73) Assignee: Cobasys, LLC, Orion, MI (US)

( * ) Notice: Subject to any disclaimer, the term of this patent is extended or adjusted under 35 U.S.C. 154(b) by 323 days.

(21) Appl. No.: 12/399,218

(22) Filed: Mar. 6, 2009

(65) Prior Publication Data

US 2010/0226059 A1     Sep. 9, 2010

(51) Int. Cl.
H01H 47/00     (2006.01)
H01H 47/26     (2006.01)

(52) U.S. Cl. .................................. 361/160; 361/161

(58) Field of Classification Search .............. 361/160, 361/161
See application file for complete search history.

(56) References Cited

U.S. PATENT DOCUMENTS

| | | | |
|---|---|---|---|
| 4,638,279 A * | 1/1987 | Brisson et al. | 335/257 |
| 5,406,440 A * | 4/1995 | Wieloch | 361/154 |
| 6,204,645 B1 * | 3/2001 | Cullen | 323/223 |
| 6,560,088 B1 * | 5/2003 | Beck et al. | 361/154 |
| 2005/0212491 A1 * | 9/2005 | Colombo et al. | 320/150 |
| 2007/0090766 A1 * | 4/2007 | LaGrave et al. | 315/82 |
| 2009/0026397 A1 * | 1/2009 | Evers | 251/129.04 |

* cited by examiner

*Primary Examiner* — Jared Fureman
*Assistant Examiner* — Scott Bauer
(74) *Attorney, Agent, or Firm* — Harness, Dickey & Pierce, P.L.C.

(57) ABSTRACT

A battery control module for a battery system includes a pulse-width modulation (PWM) module that generates N PWM signals. The battery control module also includes a contactor control module that consecutively applies the N PWM signals to close a contactor in order to connect a battery to a load. Application of a first one of the N PWM signals moves the contactor at a first velocity from an open position and application of a second one of the N PWM signals moves the contactor at a second velocity to a closed position. The first velocity is less than the second velocity. N is an integer greater than one.

20 Claims, 6 Drawing Sheets

CONTACTOR ENGAGEMENT SYSTEM AND METHOD

FIELD

The present disclosure relates to battery systems, and more particularly to a system and method for controlling contactors for batteries.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Battery systems may be used to provide power in a wide variety of applications. Exemplary transportation applications include hybrid electric vehicles (HEV), electric vehicles (EV), heavy duty vehicles (HDV) and vehicles with 42-volt electrical systems. Exemplary stationary applications include backup power for telecommunications systems, uninterruptible power supplies (UPS), and distributed power generation applications.

Examples of the types of batteries that are used include nickel metal hydride (NiMH) batteries, lead-acid batteries, and other types of batteries. A battery system may include a plurality of battery subpacks that are connected in series and/or in parallel. The battery subpacks may include a plurality of batteries that are connected in parallel and/or in series. A contactor control module may control one or more contactors that are associated with the connection of the batteries to the battery subpacks and the connection and disconnection of loads to the battery system.

SUMMARY

A battery control module for a battery system includes a pulse-width modulation (PWM) module that generates N PWM signals. The battery control module also includes a contactor control module that consecutively applies the N PWM signals to close a contactor in order to connect a battery to a load. Application of a first one of the N PWM signals moves the contactor at a first velocity from an open position and application of a second one of the N PWM signals moves the contactor at a second velocity to a closed position. The first velocity is less than the second velocity. N is an integer greater than one.

In other features, a third one of the N PWM signals moves the contactor at a third velocity that is less than the second velocity. Duty cycles of successive ones of the N PWM signals are incremented by a predetermined amount. The first one of the N PWM signals has a first duty cycle less than 100%, and the second one of the N PWM signals has a second duty cycle substantially equal to 100%. The first duty cycle is determined based on temperature and source voltage of the battery.

In other features, the battery control module includes a lookup table for determining the first duty cycle based on the temperature and the source voltage. The first duty cycle is predetermined and stored in memory prior to application of the first and second duty cycles. A battery system includes the battery control module and a battery subpack that includes the battery.

In other features, a battery control module for a battery system includes a pulse-width modulation (PWM) module that generates a first PWM signal having a first duty cycle and a second PWM signal having a second duty cycle. The first duty cycle is less than the second duty cycle. The battery control module also includes a contactor control module that consecutively applies the first PWM signal and the second PWM signal to close a contactor in order to connect a battery to a load. Application of the first PWM signal moves the contactor from an open position to a closed position and application of the second PWM signal maintains the contactor in the closed position.

In other features, the PWM module generates a third PWM signal having a third duty cycle. The third duty cycle is less than the second duty cycle. The contactor control module applies the third PWM signal to the contactor after applying the second PWM signal to further maintain the contactor in the closed position. The first duty cycle is determined based on a sensed temperature and sensed source voltage of a battery. The control module also includes a lookup table for determining the first duty cycle based on the temperature and the source voltage.

In other features, a method for operating a battery system includes generating N PWM signals and applying a first one of the N PWM signals to a contactor to move the contactor at a first velocity from an open position. The method also includes applying a second one of the N PWM signals to the contactor after applying the first one of the N PWM signals to the contactor to move the contactor at a second velocity to a closed position. The closed position connects a battery to a load. The first velocity is less than the second velocity. N is an integer greater than one.

In other features, the method includes applying a third one of the N PWM signals to the contactor to move the contactor at a third velocity that is less than the second velocity. The method also includes incrementing duty cycles of successive ones of the N PWM signals by a predetermined amount. The first one of the N PWM signals has a first duty cycle less than 100%, and the second one of the N PWM signals has a second duty cycle substantially equal to 100%. The method also includes determining the first duty cycle based on temperature and source voltage of the battery. The method also includes predetermining the first duty cycle and storing the first duty cycle in memory prior to application of the first and second duty cycles. The method also includes connecting the battery to a battery subpack by closing the contactor.

In other features, a battery control module for a battery system includes a PWM module that generates N PWM signals. The battery control module also includes a contactor control module that consecutively applies the N PWM signals to close a contactor. Application of a first one of the N PWM signals moves the contactor from an open position to an intermediate position. Application of a second one of the N PWM signals moves the contactor from the intermediate position to a closed position. The intermediate position is between the open position and the closed position. N is an integer greater than one.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As used herein, the term module refers to an Application Specific Integrated Circuit (ASIC), an electronic circuit, a processor (shared, dedicated, or group) and memory (shared, dedicated, or group) that execute one or more software or firmware programs, a combinational logic circuit, and/or other suitable components that provide the described functionality.

Figure 1:
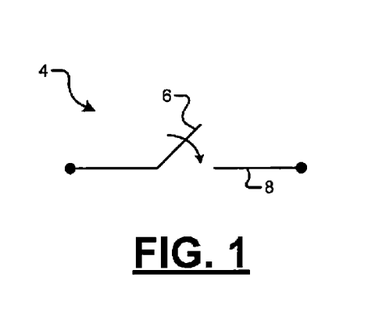
FIG. 1 is a schematic representation of a contactor according to the present disclosure.

Referring now to FIG. 1, a contactor 4 may include a magnetic coil (not shown), a moving core 6 and a stationary core 8, which are schematically illustrated as switch components. The contactor 4 is a controllable switch that may be used to connect and disconnect a load from a battery system. To operate the contactor 4, a voltage may be applied to the magnetic coil to produce a magnetic field. The magnetic field may pull the moving core 6 toward the stationary core 8 to a closed position. To open the contactor 4, the voltage may be removed from the magnetic coil, thus releasing the moving core 6 from the stationary core 8. When the contactor 4 is closed, there may be an audible noise caused by contact between the moving core 6 and the stationary core 8.

The present disclosure includes systems and methods for reducing the magnitude of the audible noise when the moving core 6 contacts the stationary core 8. The present disclosure includes applying a first signal having a first duty cycle to the contactor 4 before applying a second signal having a second duty cycle that may be higher than the first duty cycle. For example, the second duty cycle may be a 100% duty cycle, and the first duty cycle may be less than 100%.

During application of the first signal, the strength of the magnetic field may decrease, and the moving core 6 may move toward the stationary core 8 at a slower initial speed. Thus, the force applied to the stationary core 8 when the contactor 4 closes may be reduced. After the first signal is applied, the second signal may be applied to ensure the contactor 4 is fully closed. After the contactor 4 is closed, subsequent signals may be applied to the contactor 4 to maintain contact between the moving core 6 and the stationary core 8. Previously, contactor control systems applied a 100% duty cycle signal to close the contactor 4 and did not apply multiple signals having varied duty cycles.

To simplify discussion, a battery system including one battery in communication with a respective contactor will be described. However, the battery system could be expanded to include more than one battery and more than one respective contactor.

Figure 2A:
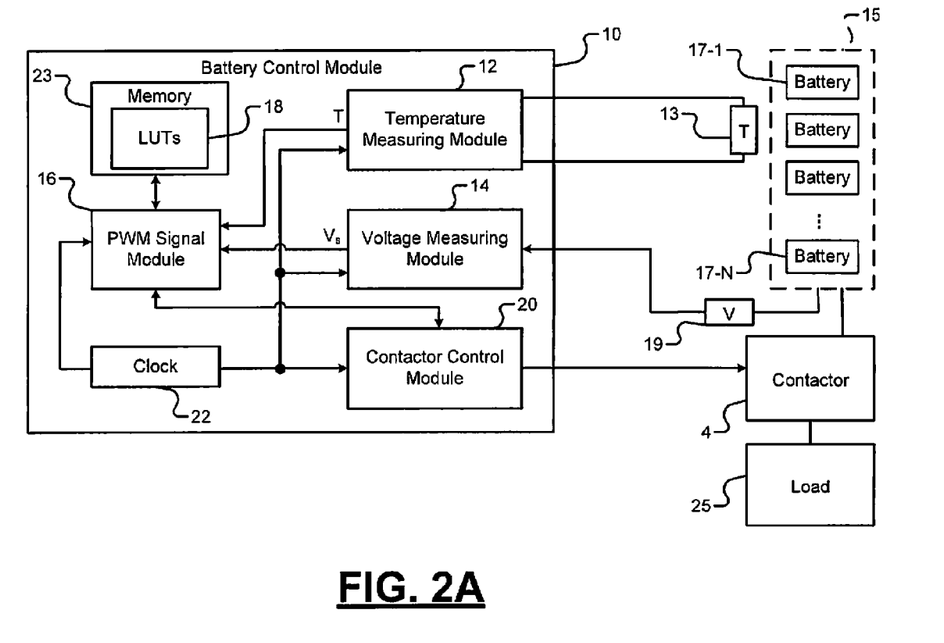
FIG. 2A is a functional block diagram of a battery control module according to the present disclosure.
Figure 2B:
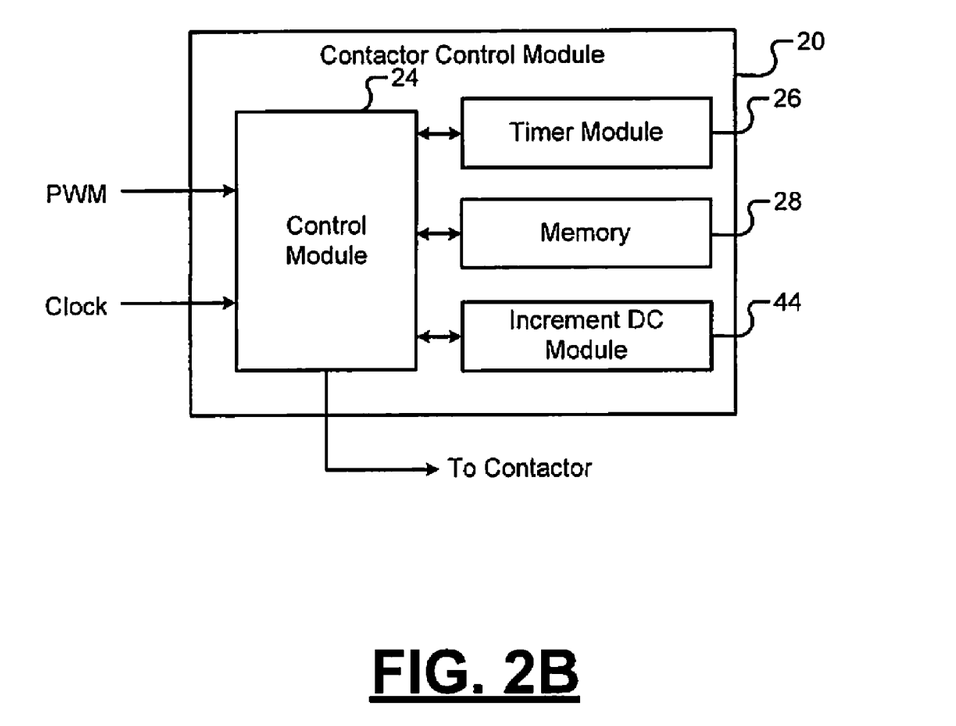
FIG. 2B is a functional block diagram of a contactor control module according to the present disclosure.

Referring now to FIGS. 2A and 2B, a battery control module 10 including a contactor control module 20 is shown. The contactor control module 20 may be in communication with the contactor 4 and may generate a contactor control signal that may control opening and closing of the contactor 4 in order to connect and disconnect a load 25. The battery control module 10 may include a temperature measuring module 12, a voltage measuring module 14, and a pulse-width modulation (PWM) signal module 16 that generates PWM signals. The temperature measuring module 12 may determine a temperature (T) of the environment around a battery subpack 15 based on signals from a temperature sensor 13. The voltage measuring module 14 may determine a source voltage ($V_s$) of a battery 17-1, ..., 17-N (referred to herein as battery 17) in the battery subpack 15. The voltage measuring module 14 may determine the source voltage based on signals from a voltage sensor 19. The PWM signal module 16 may receive the temperature and source voltage.

The PWM signal module 16 may access a look-up table (LUT) 18 stored in memory 23 to determine a duty cycle for the contactor control signal. The duty cycle may be based on, for example, the temperature and source voltage. Alternatively, the PWM signal module 16 may calculate a duty cycle based on a duty cycle stored in memory 28, or by using various other methods. After determining a duty cycle, the PWM signal module 16 may generate a PWM signal having the duty cycle. The temperature measuring module 12, voltage measuring module 14, PWM signal module 16, and contactor control module 20 may be synchronized based on a clock signal generated by clock 22.

The contactor control module 20 may include a sub-control module 24, such as a central processing unit (CPU), a timer module 26, and memory 28. The sub-control module 24 may generate a contactor control signal based on the PWM signal generated by the PWM signal module 16. The contactor control module 20 may apply the contactor control signal to the contactor 4. The timer module 26 may control the duration of time the contactor control signal is applied to the contactor 4. The memory 28 may store duty cycle values that may be used in generating the contactor control signal.

Figure 3:
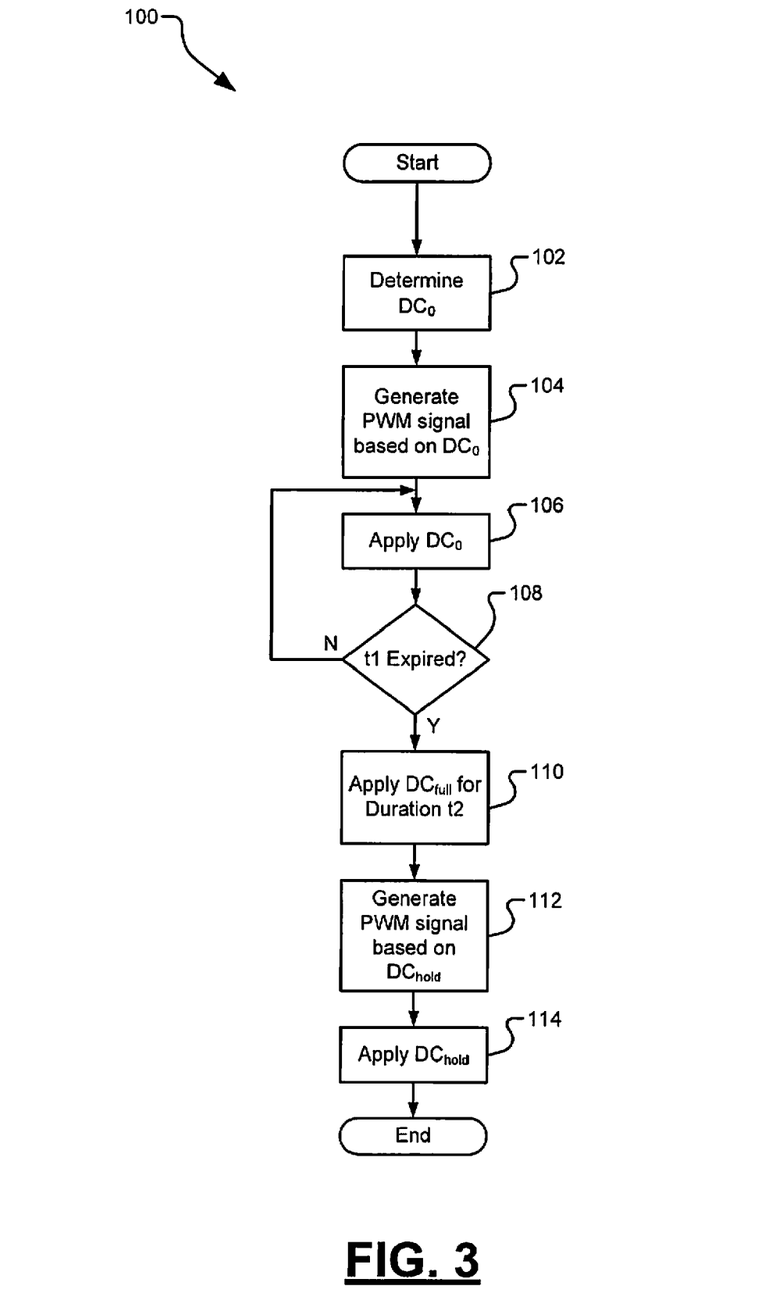
FIG. 3 is a flow chart that illustrates a method for controlling contactors according to the present disclosure.

Referring now to FIG. 3, a first method 100 is shown for reducing audible noise when closing the contactor 4. In step 102, the battery control module 10 determines a first duty cycle ($DC_0$) for the contactor control signal. The first duty cycle may be lower than 100%. To determine the first duty cycle, the temperature measuring module 12 may determine the temperature of the environment around the battery subpack 15 based on signals from the temperature sensor 13. The temperature sensor 13 may be a thermistor, thermocouple, resistance temperature detector, or various other sensors. The voltage measuring module 14 may determine the source voltage of a battery 17 in communication with the contactor 4 based on signals from the voltage sensor 19.

The contactor 4 may respond to the contactor control signal based on temperature and source voltage. At lower temperatures, such as around −40° C., a lower duty cycle may be used to generate a magnetic field strong enough to close the contactor 4. At higher temperatures, such as around 100° C., a higher duty cycle may be used to generate a magnetic field strong enough to close the contactor 4. Further, the source voltage of the battery 17 may vary over time. For example, if the contactor 4 is connected to a 12V battery, the source voltage of the battery 17 may range from, for example, 11V to 13V. At a higher source voltage, a lower duty cycle may be used to generate a magnetic field strong enough to close the contactor 4. At a lower source voltage, a higher duty cycle may be used to generate a magnetic field strong enough to close the contactor 4.

The PWM signal module 16 may receive the temperature and source voltage. The PWM signal module 16 may access the LUT 18 to determine the first duty cycle for the contactor control signal. The LUT 18 may include one or more lookup tables for determining a duty cycle based on at least the temperature and source voltage. The lookup tables may be derived from observations of contactor responses with respect to a range of operating temperatures, such as −40° C. to 100° C., and/or a range of source voltages. Additional lookup tables may be derived based on additional operating characteristics that may affect the response of the contactor 4.

The PWM signal module 16 may determine the first duty cycle based on a duty cycle stored in the LUT 18. For example, if the measured temperature is 20° C. and the measured source voltage is 11V, the PWM signal module 16 will access the LUT 18 and search for a duty cycle corresponding to 20° C. and 11V. If there is a duty cycle in the LUT 18 corresponding to 20° C. and 11V, the PWM signal module 16 uses that duty cycle. However, the duty cycles in the LUT 18 do not appear to correspond to 20° C. and 11V, the PWM signal module 16 may interpolate a value for the duty cycle based on the closest duty cycles in the LUT 18. For example, if there is a duty cycle for 15° C. and 25° C. at 11V, the PWM signal module 16 may determine the duty cycle by taking an average of the duty cycle at 15° C. and the duty cycle at 25° C. Alternatively, the first duty cycle may be stored in memory 28.

Alternatively, the first duty cycle may be determined from nth order and ith order polynomial equations that use the temperature and source voltage as independent variables, where n and i are integers greater than or equal to one. Initially, the PWM signal module may generate X sets of nth order coefficients ($C_0$-$C_n$) based on the duty cycle needed to close the contactor 4 as a function of source voltage over a range of temperatures ($T_1$-$T_x$). For an nth order polynomial equation, there are (n+1) coefficients. The coefficients may be determined from measurements of the duty cycle over a range of source voltages and temperatures using the following nth order polynomial equation:

$$DC_0(T)=C_0+\ldots+V_S^n \times C_n.$$

Thus, for each temperature ($T_1$-$T_X$) there may be a set of coefficients ($C_{0[X]}$-$C_{n[X]}$), resulting in X sets of coefficients, with each set having (n+1) coefficients. For example, for $T_1$ there may be a set of coefficients ($C_{0[1]}$, $C_{1[1]}$, ..., $C_{n[1]}$), and for $T_X$ there may be a set of coefficients ($C_{0[X]}$, $C_{1[X]}$, ..., $C_{n[X]}$).

Next, each nth order coefficient from the X sets of coefficients may be fit to an ith order polynomial. In other words, ($C_{0[1]}$, ..., $C_{0[X]}$) may be fit to an ith order polynomial, and ($C_{n[1]}$, ..., $C_{n[X]}$) may be fit to an ith order polynomial, etc. For example, where i is equal to one, a first order fit of the coefficients may be generated from the following exemplary equation:

$$DC_0 = C_{0\_0} + C_{0\_1} \times T + V_S \times (C_{1\_1} \times T + C_{1\_0}) + \ldots + V_S^n \times (C_{n\_1} \times T + C_{n\_0}),$$

where $C_{0\_0} + C_{0\_1} \times T$ represents the first order fit of ($C_{0[1]}$, ..., $C_{0[X]}$), $C_{1\_1} \times T + C_{1\_0}$ represents the first order fit of ($C_{1[1]}$, ..., $C_{1[X]}$), and $C_{n\_1} \times T + C_{n\_0}$ represents the first order fit of ($C_{n[1]}$, ..., $C_{n[X]}$). Although the exemplary equation is shown using a first order fit of the coefficients, the exemplary equation could be expanded to an ith order fit, where i is an integer greater than or equal to one.

In step 104, the PWM signal module 16 generates a first PWM signal having a duty cycle corresponding to the first duty cycle. In step 106, the sub-control module 24 may generate a first contactor control signal based on the first PWM signal. The contactor control module 20 may apply the first contactor control signal to the contactor 4 for a first time period (t1). In step 108, the timer module 26 may determine when the first time period has expired. If the first time period had not expired, the contactor control module 20 may continue to apply the first contactor control signal. If the first time period has expired, in step 110, the sub-control module 24 may generate a second contactor control signal based on a second PWM signal having a second duty cycle ($DC_{full}$), such as a 100% duty cycle. The second PWM signal may be generated by the PWM signal module 16 using settings for the second duty cycle stored in memory 28. The contactor control module 20 may apply the second PWM signal to the contactor 4 for a second time period (t2). The second time period may or may not be the same duration as the first time period.

In step 112, the sub-control module 24 may generate a third contactor control signal based on a third PWM signal having a third duty cycle ($DC_{hold}$). The third duty cycle may be lower than 100%. The third PWM signal may be generated by the PWM signal module 16 using settings for a third duty cycle stored in memory 28. Alternatively, the PWM signal module 16 may determine the third duty cycle from the LUT 18 based on temperature and source voltage measurements. The PWM signal module 16 may also determine the third duty cycle using the nth and ith order polynomial equations. In step 114, the contactor control module 20 may apply the third PWM signal to the contactor 4 to maintain contact between the moving core 6 and the stationary core 8. The third PWM signal may be applied until the contactor control module 20 receives a signal to open the contactor 4.

Figure 4:
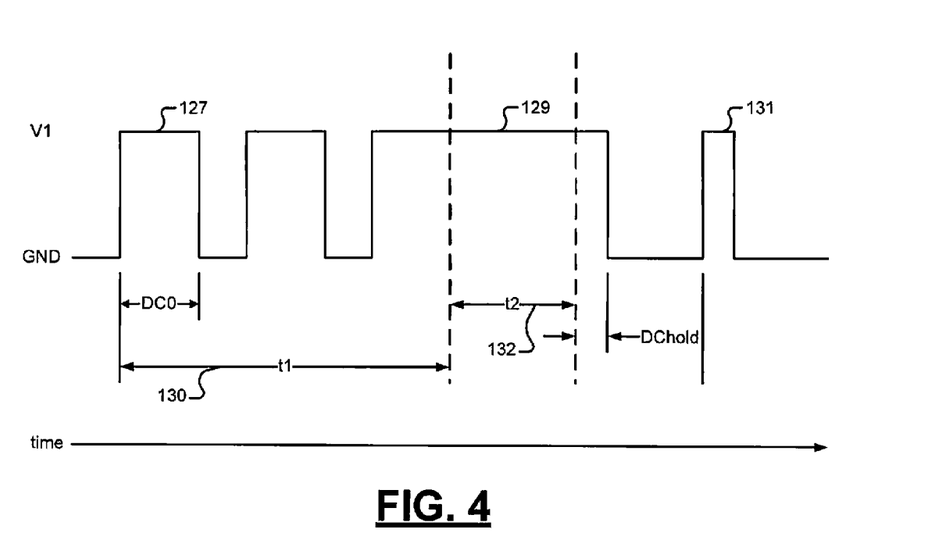
FIG. 4 is a signal diagram according to the present disclosure.

Referring now to FIG. 4, the method 100 for reducing audible noise when closing the contactor 4 may be further described. FIG. 4 is a graphical depiction of the duty cycle of the contactor control signal over time (t), according to the method 100 of the present disclosure. The contactor control module 20 may apply a first contactor control signal 127 having the first duty cycle ($DC_0$) for a first time period 130. The contactor control module 20 may subsequently apply a second contactor control signal 129 having the second duty cycle ($DC_{full}$), such as a 100% duty cycle, for a second time period 132. The contactor control module 20 may subsequently apply a third contactor control signal 131 having the third duty cycle ($DC_{hold}$). The contactor control module 20 may apply the third contactor control signal 131 until the contactor control module 20 receives a signal to open the contactor 4.

Figure 5:
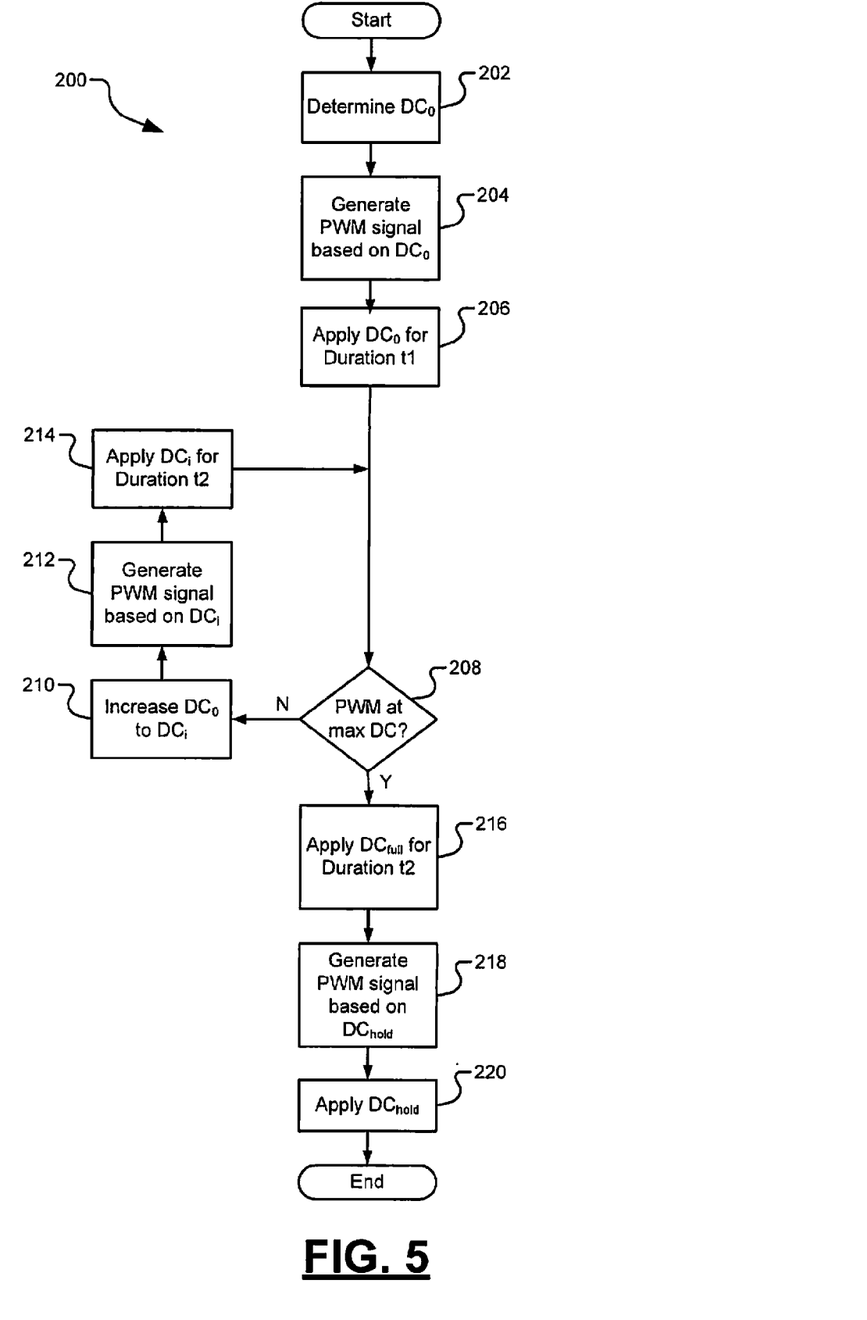
FIG. 5 is a flow chart that illustrates a method for controlling contactors according to the present disclosure.

Referring now to FIG. 5, a second method 200 is shown for reducing audible noise when the contactor 4 closes. In step 202, the battery control module 10 determines a first duty cycle ($DC_0$) for the contactor control signal. The first duty cycle may be less than 100%.

The PWM signal module 16 may access the LUT 18 to determine the first duty cycle. Alternatively, the first duty cycle may be stored in memory 28 or may be determined from the nth and ith order polynomial equations. In step 204, the PWM signal module 16 generates a first PWM signal having the first duty cycle.

In step 206, the sub-control module 24 may generate a first contactor control signal based on the first PWM signal. The contactor control module 20 may apply the first contactor control signal to the contactor 4 for a first time period (t1). The timer module 26 may determine when the first time period has expired. In step 208 the sub-control module 24 may determine if the incremented duty cycle is equal to a maximum duty cycle, such as a 100% duty cycle. If the incremented duty cycle is not equal to the maximum duty cycle, in step 210, an increment duty cycle (DC) module 44 may increment the first duty cycle to an incremented duty cycle ($DC_i$). The first duty cycle may be incremented by a predetermined amount or may be incremented based on temperature and source voltage measurements. In step 212, the PWM signal module 16 generates a second PWM signal having a duty cycle corresponding to the incremented duty cycle.

In step 214, the sub-control module 24 may generate a second contactor control signal based on the second PWM signal. The contactor control module 20 may apply the second contactor control signal to the contactor 4 for a second time period (t2). The second time period may or may not be the same duration as the first time period. The timer module 26 may determine when the second time period has expired. Steps 208-214 may repeat until the contactor control module 20 determines that the incremented duty cycle ($DC_i$) is equal to the maximum duty cycle.

In step 216, the contactor control signal may have the maximum duty cycle ($DC_{full}$). The contactor control module 20 may continue to apply the contactor control signal having the maximum duty cycle for a third time period (t3). The third time period may or may not be the same duration as the second time period (t2) and/or first time period (t1).

In step 218 the sub-control module 24 may generate a contactor control signal based on a third PWM signal having a third duty cycle ($DC_{hold}$). The third duty cycle may be lower than 100%. The third PWM signal may be generated by the PWM signal module 16 using settings for the third duty cycle stored in memory 28. Alternatively, the PWM signal module 16 may determine the third duty cycle from the LUT 18 using temperature and source voltage measurements. The PWM signal module 16 may also determine the third duty cycle from the nth and ith order polynomial equations. In step 220, the contactor control module 20 may apply the third contactor control signal to the contactor 4 to maintain contact between the moving core 6 and the stationary core 8. The third PWM signal may be applied until the contactor control module 20 receives a signal to open the contactor 4.

Figure 6:
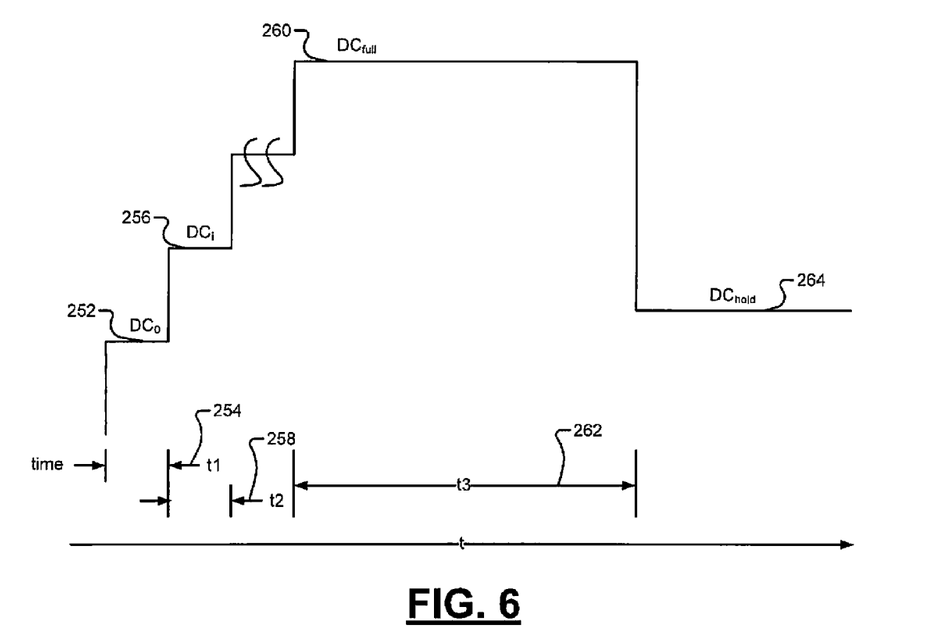
FIG. 6 is a signal diagram according to the present disclosure.

Referring now to FIG. 6, the method 200 for reducing audible noise when closing the contactor 4 may be further described. FIG. 6 is a graphical depiction of the duty cycle of the contactor control signal over time (t), according to the method 200 of the present disclosure. The contactor control module 20 may apply a first contactor control signal having a first duty cycle 252 corresponding to $DC_0$ for a first time period 254. The contactor control module 20 may apply a second contactor control signal having an incremented duty cycle 256 corresponding to $DC_i$ for a second time period 258.

The contactor control module 20 may continue to increment the duty cycle of the contactor control signal until the duty cycle is equal to the maximum duty cycle. The contactor control module 20 may apply a third contactor control signal having a third duty cycle 260 corresponding to $DC_{full}$ for a third time period 262. The contactor control module 20 may apply a fourth contactor control signal having a fourth duty cycle 264 corresponding to $DC_{hold}$. The contactor control module 20 may apply the fourth contactor control signal until the contactor control module 20 receives a signal to close the contactor 4.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A battery control module for a battery system comprising:
    a pulse-width modulation (PWM) module that generates N PWM signals; and
    a contactor control module that consecutively applies the N PWM signals to close a contactor,
    wherein a first one of the N PWM signals has a first duty cycle,
    wherein the first duty cycle is determined based on a temperature and a source voltage of a battery,
    wherein application of the first one of the N PWM signals moves the contactor at a first velocity from an open position and application of a second one of the N PWM signals moves the contactor at a second velocity to a closed position,
    wherein the first velocity is less than the second velocity, and
    wherein N is an integer greater than one.

2. The battery control module of claim 1, wherein a third one of the N PWM signals moves the contactor at a third velocity that is less than the second velocity.

3. The battery control module of claim 1, wherein duty cycles of successive ones of the N PWM signals are incremented by a predetermined amount.

4. The battery control module of claim 1, wherein the first duty cycle is less than 100%, and wherein the second one of the N PWM signals has a second duty cycle that is substantially equal to 100%.

5. A system comprising:
    the battery control module of claim 1;
    a battery subpack that includes the battery; and
    the contactor that connects the battery to a load.

6. The battery control module of claim 1, further comprising a lookup table for determining the first duty cycle based on the temperature and the source voltage.

7. The battery control module of claim 4, wherein the first duty cycle is predetermined and stored in memory prior to application of the first and second duty cycles.

8. A battery control module for a battery system comprising:
    a pulse-width modulation (PWM) module that generates a first PWM signal having a first duty cycle and a second PWM signal having a second duty cycle, wherein the first duty cycle is less than the second duty cycle, and wherein the first duty cycle is determined based on a temperature and a source voltage of a battery; and
    a contactor control module that consecutively applies the first PWM signal and the second PWM signal to close a contactor in order to connect the battery to a load,
    wherein application of the first PWM signal moves the contactor from an open position to a closed position and application of the second PWM signal maintains the contactor in the closed position.

9. The battery control module of claim 8, wherein the PWM module generates a third PWM signal having a third duty cycle, wherein the third duty cycle is less than the second duty cycle.

10. The battery control module of claim 9, wherein the contactor control module applies the third PWM signal to the contactor after applying the second PWM signal, to further maintain the contactor in the closed position.

11. The battery control module of claim 8, further comprising a lookup table for determining the first duty cycle based on the temperature and the source voltage.

12. A method for operating a battery system comprising:
generating N PWM signals;
applying a first one of the N PWM signals to a contactor to move the contactor at a first velocity from an open position, wherein a first one of the N PWM signals has a first duty cycle, and wherein the first duty cycle is determined based on a temperature, and a source voltage of a battery; and
applying a second one of the N PWM signals to the contactor after applying the first one of the N PWM signals to the contactor to move the contactor at a second velocity to a closed position in order to connect the battery to a load, wherein the first velocity is less than the second velocity, and wherein N is an integer greater than one.

13. The method of claim 12, further comprising applying a third one of the N PWM signals to the contactor to move the contactor at a third velocity that is less than the second velocity.

14. The method of claim 12, further comprising incrementing duty cycles of successive ones of the N PWM signals by a predetermined amount.

15. The method of claim 12, wherein the first duty cycle less than 100%, and wherein the second one of the N PWM signals has a second duty cycle that is substantially equal to 100%.

16. The method of claim 15, further comprising predetermining the first duty cycle and storing the first duty cycle in memory prior to application of the first and second duty cycles.

17. The method of claim 12, further comprising connecting the battery to a battery subpack by closing the contactor.

18. A battery system comprising:
a pulse-width modulation (PWM) module that generates N PWM signals;
a contactor; and
a contactor control module that consecutively applies the N PWM signals to close the contactor,
wherein a first one of the N PWM signals has a first duty cycle,
wherein the first duty cycle is determined based on a temperature and a source voltage of a battery,
wherein application of the first one of the N PWM signals moves the contactor from an open position to an intermediate position and application of a second one of the N PWM signals moves the contactor from the intermediate position to a closed position, wherein the intermediate position is between the open position and the closed position, and wherein N is an integer greater than one.

19. The battery system of claim 18, wherein duty cycles of successive ones of the N PWM signals are incremented by a predetermined amount.

20. The battery system of claim 18, wherein the first duty cycle less than 100%, and wherein the second one of the N PWM signals has a second duty cycle that is substantially equal to 100%.

* * * * *

UNITED STATES PATENT AND TRADEMARK OFFICE
CERTIFICATE OF CORRECTION

| | | |
|---|---|---|
| PATENT NO. | : 8,149,558 B2 | Page 1 of 1 |
| APPLICATION NO. | : 12/399218 | |
| DATED | : April 3, 2012 | |
| INVENTOR(S) | : Carlton D. Brown et al. | |

It is certified that error appears in the above-identified patent and that said Letters Patent is hereby corrected as shown below:

Column 9, Line 23    Before "less", insert --is--
Column 10, Line 25   After "cycle", insert --is--

Signed and Sealed this
Nineteenth Day of June, 2012

David J. Kappos
*Director of the United States Patent and Trademark Office*